United States Patent
Hattori

(10) Patent No.: US 6,369,911 B1
(45) Date of Patent: Apr. 9, 2002

(54) APPARATUS FOR GENERATING PULSE-WIDTH DATA FOR TONER-TRANSFER-TYPE PRINTING APPARATUS

(75) Inventor: Toshiyuki Hattori, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 08/972,839

(22) Filed: Nov. 18, 1997

(30) Foreign Application Priority Data

Nov. 19, 1996 (JP) .............................. 8-308410

(51) Int. Cl.$^7$ ............................. G06K 15/02; G06F 3/12
(52) U.S. Cl. ...................... 358/1.9; 382/205; 358/456
(58) Field of Search ................... 395/109, 108, 395/102, 103, 111, 115, 116, 117; 358/298, 456, 457, 458, 459, 460, 1.9, 410; 382/199–200, 205, 266

(56) References Cited

U.S. PATENT DOCUMENTS

| | | | | |
|---|---|---|---|---|
| 4,625,330 A | * | 11/1986 | Higgins | 382/27 |
| 4,896,364 A | * | 1/1990 | Lohscheller | 382/22 |
| 5,187,495 A | | 2/1993 | Tanimoto et al. | 346/108 |
| 5,255,351 A | * | 10/1993 | Takanashi et al. | 395/109 |
| 5,287,209 A | | 2/1994 | Hiratsuki et al. | 395/109 |
| 5,396,584 A | * | 3/1995 | Lee et al. | 395/132 |
| 5,495,341 A | | 2/1996 | Kawana et al. | 358/298 |
| 5,633,669 A | * | 5/1997 | Hada et al. | 347/132 |
| 5,646,670 A | * | 7/1997 | Seto et al. | 347/131 |
| 5,689,586 A | * | 11/1997 | Lin | 382/232 |
| 5,721,793 A | * | 2/1998 | Ushida et al. | 382/300 |
| 5,892,852 A | * | 4/1999 | Namizuba et al. | 382/254 |

FOREIGN PATENT DOCUMENTS

| | | |
|---|---|---|
| EP | 0 109 005 | 5/1984 |
| EP | 0 216 462 | 4/1987 |
| EP | 0 528 365 | 2/1993 |
| WO | WO 95/02938 | 1/1995 ............ H04N/4/41 |

* cited by examiner

Primary Examiner—Joseph Mancuso
Assistant Examiner—Douglas Tran

(57) ABSTRACT

To convert gray-scale data of each pixel of image data into pulse-width data for each pixel, a RAM is provided. The RAM has nine pixel memory regions corresponding to nine pixels a to i for forming, for example, a 3×3 pixel matrix on the output image. In each of the pixel memory regions, there are stored pulse-width data items corresponding to values which are permitted for gray-scale data to have. Pulse-width data items in the pixel memory regions are slightly different from one another among pixel memory regions. Gray-scale data of each pixel of image data and address word composed of gray-scale data of each pixel of image data and coordinates of each pixel in the 3×3 matrix is supplied to the RAM. Thus, pulse-width data corresponding to gray-scale data is read from the pixel memory region so that a laser drive pulse having a pulse width corresponding to the read pulse-width data is generated.

10 Claims, 8 Drawing Sheets

APPARATUS FOR GENERATING PULSE-WIDTH DATA FOR TONER-TRANSFER-TYPE PRINTING APPARATUS

BACKGROUND OF THE INVENTION

1. Field of the Invention

The present invention relates to an apparatus for generating pulse-width data for expressing a multiplicity of gray scales to supply the pulse-width data to a printing engine of a toner-transfer-type printing apparatus, such as a laser printer or a copying machine.

2. Description of the Related Art

A toner-transfer-type printing apparatus is able to print a multi-gray-scale image by adjusting the pulse width of a drive pulse signal for driving drawing laser in a printing engine because the quantity of toner for each pixel to be allowed to adhere can be changed. Since the minimum size of toner particles however is limited, the number of gray scale levels, which can be expressed, is reduced in inverse proportion to the resolution of an image required to be printed. An assumption is made that image data having a resolution of 600 dpi and 256 gray scale levels is created on a personal computer and image data above is printed by a laser printer having a printing resolution of 600 dpi. One pixel having a resolution of 600 dpi is in the form of a square region, one side of which is 1/600 inch. The number of toner particles allowed to adhere to the square region is limited to about 20 to 30. Therefore, the image printed by the laser printer is able to reproduce at most 20 to 30 gray scale levels.

As described above, the conventional toner-transfer-type printing apparatus suffers from a problem in that the apparatus cannot reproduce a number of gray scale levels on a print output therefrom even if image data expressing the number of gray scale levels exceeding the number of toner particles allowed to adhere to one pixel region is supplied.

SUMMARY OF THE INVENTION

Accordingly, an object of the present invention is to enable a toner-transfer-type printing apparatus to reproduce, on an output image therefrom, a number of gray scale levels which is larger than the number of toner particles allowed to adhere to one pixel region, and more specifically to print an output image with which the sense of sight of a human being recognizes a fact that such a large number of gray scale levels has been reproduced.

To achieve the above-mentioned object, according to the present invention, there is provided a pulse-width data generating apparatus for use in a toner-transfer-type printing apparatus. The apparatus according to the present invention comprises pulse-width generating means which receives the image data to generate pulse-width data of each pixel corresponding to coordinates of each pixel in a N×M pixel matrix (N and M are positive integers) virtually tiled on the output image and the gray-scale data of each pixel in the image data; and position-data generating means which receives the pulse-width data to subject the pulse-width data of pixels on two sides of each pixel on the output image to a comparison to generate position data for controlling toner adhesion positions of each pixel based on a result of the comparison. Preferably, a memory having N×M pixel memory regions corresponding to N×M pixels in the N×M pixel matrix on the output image is provided, and pulse-width data corresponding to values for the gray-scale data are stored in each of said pixel memory regions. When the coordinates of each pixel in said N×M pixel matrix corresponding to the pixels in the image data and the gray-scale data of each pixel in the image data are provided to the memory, the pulse-width data corresponding to the gray-scale data are read out from said pixel memory region addressed by the coordinates.

The pulse-width data generating apparatus according to the present invention determines the pulse width data corresponding to the coordinates of the pixels in the N×M matrix, and can change the pulse width data among the pixels in the N×M matrix slightly. Therefore, it enables the overall N×M matrix on the output image to reproduce the number of gray scale levels which is approximately N×M times the number of gray scale levels which can be expressed by one pixel. In general, it is difficult for the sense of sight of a human being to distinguish pixels each having a high resolution of about 300 dpi from each other. When a printing engine for forming an output image having a high resolution of, for example, 600 dpi is employed, expression of a required gray scale with an appropriate size near the minimum limit for the sense of sight for a human being, such as 2×2 pixel matrix (corresponding to 300 dpi) or 3×3 pixel matrices (corresponding to 200 dpi), enables for the sense of sight for a human being to recognize as if the required number of the gray scale levels has been reproduced on the output image.

It is preferable that an inverted γ-characteristic for correcting a γ-characteristic of the printing engine is incorporated to pulse-width data in the memory. In the foregoing case, a structure in which the inverted γ-characteristics incorporated to pulse-width data are made to be slightly different from one another among the pixels in the N×M matrix causes a precise inverted γ-characteristic to appear in pulse-width data of the overall N×M matrices attributable to a principle like the above-mentioned principle with which the number of gray scale levels which can be expressed increases. As a result, precise γ-correction can be performed.

Further, the apparatus according to the present invention subjects pulse-width data items of pixels on the two sides of each pixel to a comparison, and generates position data of each pixel corresponding to a result of the comparison. This position data indicates a pixel of the pixels on the two sides of each pixel that has higher density. When the position at which a pulse signal to be supplied to the printing engine is generated is controlled in accordance with position data, adjustment can be performed in such a manner that the position at which toner for each pixel on the output image is allowed to adhere is approached to the pixel of the side pixels having higher density. The process for collecting the positions, at each of which toner is allowed to adhere to form pixels, to integrate dots has a conventional technique for improving the quality of an output image. However, the apparatus according to the present invention, arranged in such a manner that the toner adhesion position is automatically determined in accordance with pulse-width data for each pixel, enables a necessity of previously providing, to image data, position data for instructing the toner adhesion position to be eliminated. Thus, an advantage can be realized in that the capacity of the image memory for storing image data can be saved by the foregoing degree.

DETAILED DESCRIPTION OF THE PREFERRED EMBODIMENTS

Figure 1:
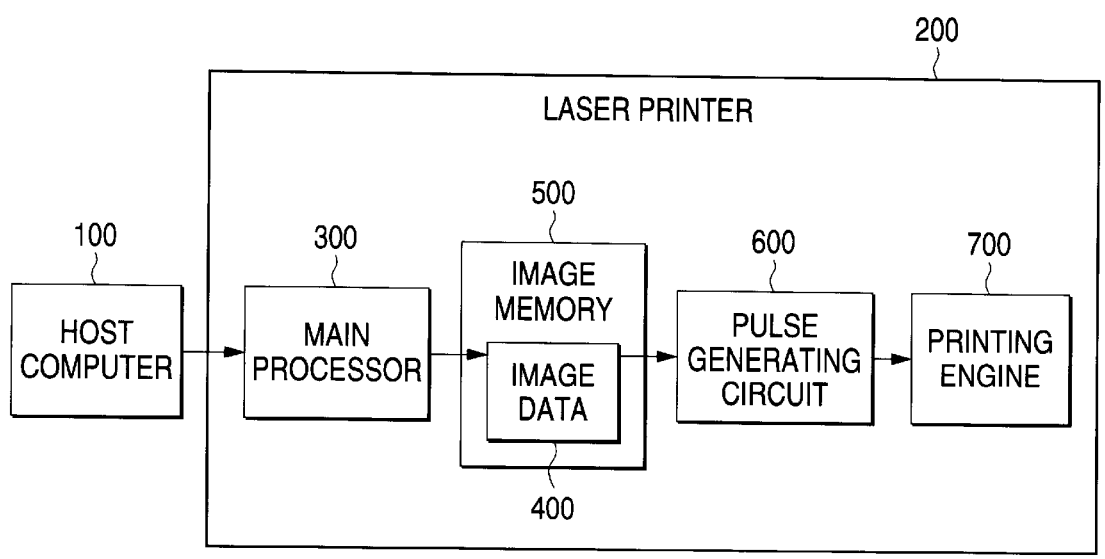
FIG. 1 is a block diagram showing the overall structure of an embodiment of a laser printer including a pulse generating circuit according to the present invention.

FIG. 1 shows an overall structure of an embodiment of a laser printer including a pulse generating circuit according to the present invention.

As shown in FIG. 1, a laser printer 200 has a main processor (a microcomputer) 300. The main processor 300 processes sequential printing commands supplied from a host computer 100 to generate a bit-map type image data 400. Image data 400 is stored in an image memory 500. A pulse generating circuit 600 according to the present invention is connected to the image memory 500. The pulse generating circuit 600 makes a direct memory access (DMA) to read image data 400 from the image memory 500 so as to generate, from gray-scale data of each pixel of image data 400, a laser drive pulse for driving a drawing laser in a printing engine 700.

Figure 2:
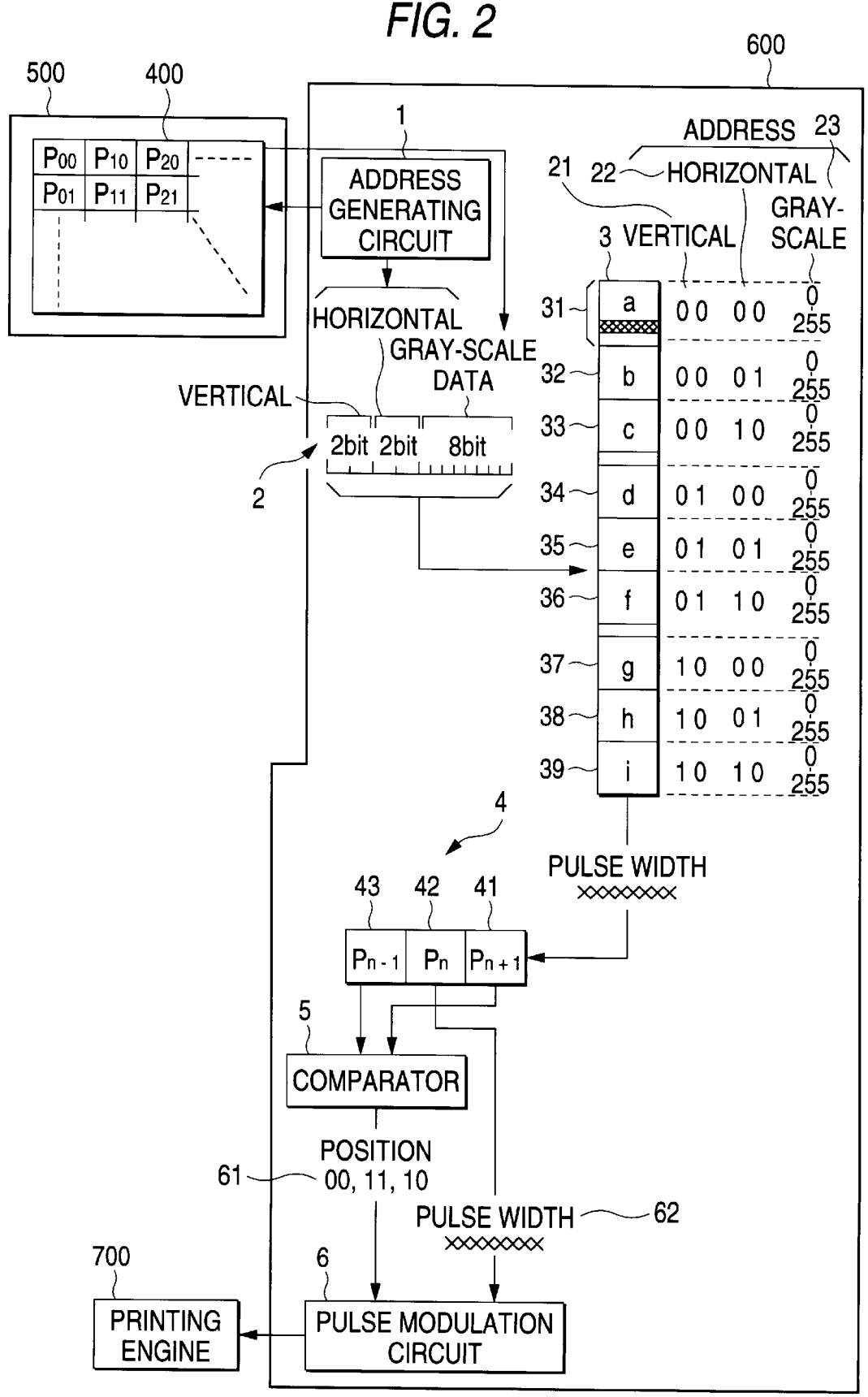
FIG. 2 is a circuit diagram showing the pulse generating circuit.
Figure 3:
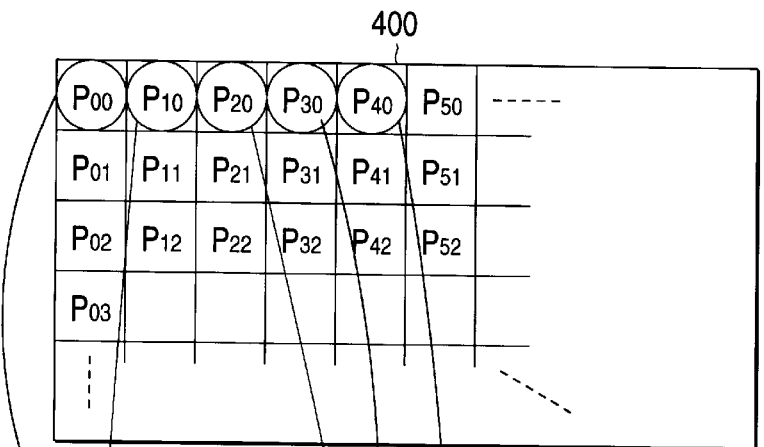
FIGS. 3(A) to 3(C) are diagrams showing the operation of the pulse generating circuit.
Figure 3:
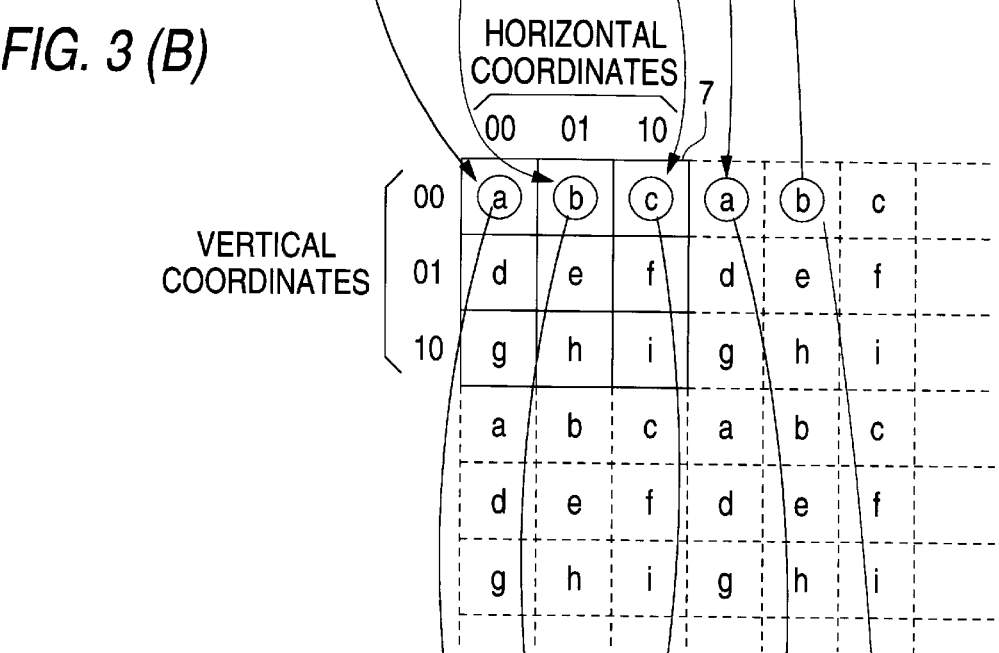
Figure 3:
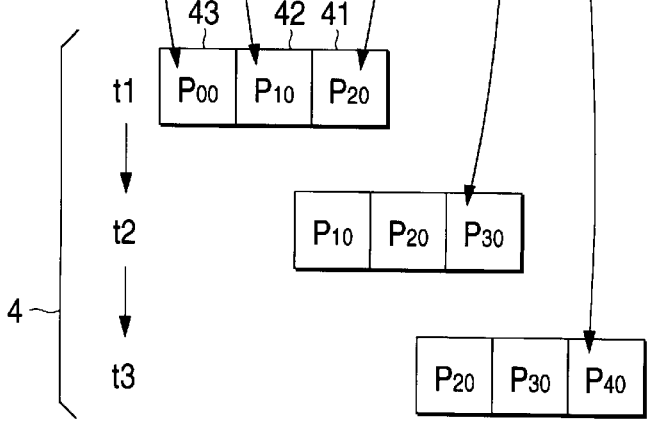

FIG. 2 shows the structure of the pulse generating circuit 600. FIGS. 3(A) to 3(C) shows the operation of the pulse generating circuit 600.

As shown in FIG. 2, the pulse generating circuit 600 includes an address generating circuit 1, a RAM 3, a shift register 4, a comparator 5 and a pulse modulation circuit 6.

The address generating circuit 1 generates address data for pixels P00, P01, P20, . . . , of image data 400 in the image memory 500 to supply address data to the image memory 500. The image memory 500 responds each of the pixel address data items to output gray-scale data 23 of each of the pixels P00, P01, P20, . . . , of image data 400 to the pulse generating circuit 600. Gray-scale data of each of the pixels P00, P01, P20, . . . , of image data 400 is, for example, 8-bit data. Namely, the gray scale value of each pixel is expressed by 256 levels.

The RAM 3 has nine pixel memory regions 31 to 39. Each of the pixel memory regions 31 to 39 corresponds to nine pixels a to i which form, on an output image which must be printed out, one 3×3 pixel matrix 7 as shown in FIG. 3(B). In each of the pixel memory regions 31 to 39, 256 eight-bit words (indicated with xxxxxxxx) are stored. Each eight-bit word indicates the pulse width of a laser drive pulse which is supplied to the printing engine 700. By adjusting the pulse width, the quantity of toner for each pixel on the output image, that is, the gray scale can be adjusted. Therefore, 256 types of 8-bit pulse-width data items for changing the gradations of the corresponding pixels a to i on the output image are stored in each of the pixel memory regions 31 to 39.

All of the pulse-width data items are previously programmed in a ROM (not shown) in the laser printer so as to be loaded from the ROM to the RAM 3 when, for example, the laser printer is turned on. It is preferable that standard pulse-width data read from the ROM be subjected to correction which is performed in consideration of the environmental conditions, including the temperature, humidity and power supply voltage at the loading operation and then corrected pulse-width data be stored in the RAM 3.

Each pulse-width data in the RAM 3 is addressed with a 12-bit address word 2. The address word 2 includes a 2-bit vertical coordinate data 21, 2-bit horizontal coordinate data 22 and 8-bit (having 256 gray scale levels) gray-scale data 23. Vertical coordinate data 21 and horizontal coordinate data 22 are generated by the address generating circuit 1 in accordance with each of the pixel address data items to indicate the vertical coordinates and the horizontal coordinates of each pixel of one 3×3 pixel matrix 7 on the output image shown in FIG. 3 (B). Eight-bit gray-scale data 23 is each pixel data of image data 400 read from the image memory 500.

Each pixel of image data 400 in the image memory 500 is sequentially addressed in the order of raster scan by the address generating circuit 1. Therefore, as shown in FIG. 3(A), reading starts at pixel P00 at the left-hand end of the uppermost line, and then pixels P10, P20, P30, . . . , on the uppermost line are sequentially read. Then, pixels P01, P11, P21, P31, . . . , on the second line are, similarly, sequentially read, and then pixels on the third line are read. The foregoing operation is repeated to reach the lowermost line. Each pixel in the 3×3 pixel matrix 7 on the output image as shown in FIG. 3(B) is made to correspond to each pixel of image data 400. Since a multiplicity of 3×3 pixel matrices 7 are virtually tiled (in the form of tiles) on the output image as shown in FIG. 3(B), each of all of the pixels of image data 400 are made to correspond to any one of the pixel in the 3×pixel matrix 7. For example, pixels P00, P10, P20, P30 and P40 of image data 400 correspond to pixels a, b, c, a and b of the 3×3 pixel matrix 7, respectively. In accordance with the correspondence made as described above, the address generating circuit 1 generates, from the address data of each pixel, the above-mentioned vertical coordinate data 21 and horizontal coordinate data 22 for each pixel.

Vertical coordinate data 21 and horizontal coordinate data 22 for each pixel address one pixel memory region in the RAM 3 corresponding to the position of each pixel on the 3×3 pixel matrix 7. Gray-scale data 23 for each pixel addresses one pulse-width data item in one corresponding pixel memory region. As described above, one pulse-width data item in the RAM 3 for each pixel of image data 400 is addressed. Pulse-width data above is read from the RAM 3, and then supplied to the shift register 4.

The shift register 4 has three stages 41, 42 and 43 and receives pulse-width data sequentially read from the RAM 3 by the first stage 41 thereof to sequentially transfer the same to the second stage 42 and the third stage 43. Thus, the shift register 4 is caused to always have pulse-width data of three pixels Pn−1, Pn and Pn+1 continued in the horizontal direction on image data 400. As a result, the three pixels Pn−1, Pn and Pn+1 move on the image along the raster scanning passage. Assuming that pulse-width data of pixels P00, P10 and P20 is stored in the shift register 4 at time t1 as shown in FIG. 3(C), pulse-width data of pixels P10, P20 and P30 shifted to the right by one pixel is stored in next time t2, and then pulse-width data P20, P30 and P40 further shifted by one pixel is stored at next time t3.

Pulse-width data items of pixels Pn−1 and Pn+1 in the stages 43 and 41 at the two ends of the shift register 4 are supplied to the comparator 5. The comparator 5 subjects pulse-width data items of the two pixels Pn−1 and Pn+1 to a comparison to output 2-bit position data 61 indicating the position of a pixel having a larger pulse width (that is, a pixel having a higher density). If the right-hand pixel Pn+1 has a higher density, "00" is output as position data 61. If the left-hand pixel Pn−1 has a higher density, "10" is output. If the densities of the two pixels Pn−1 and Pn+1 are the same, "11" is output. Position data 61 above is supplied to the pulse modulation circuit 6. Pulse-width data 62 of pixel Pn in the central stage 42 of the shift register 4 is directly supplied to the pulse modulation circuit 6.

In accordance with 2-bit position data 61 and 8-bit pulse-width data 62, the pulse modulation circuit 6 generates a laser drive pulse for drawing the central pixel Pn as follows: the pulse width (a duty ratio) of the laser drive pulse is determined in accordance with 8-bit pulse-width data 62. Therefore, the duty ratio of the drive pulse, that is, the gray scale value of the pixel is modulated to 256 levels. The position of the laser drive pulse in terms of time, that is, the spatial position in the pixel region to which toner is allowed to adhere is determined to be in the right-half portion if position data 61 is "00". If data above is "10", the position is determined to be in the left-half portion. If data above is "11", the position is determined to be the center. That is, the toner adhesion position is approached to the pixel Pn−1 or the pixel Pn+1 adjacent laterally that has a higher density.

Figure 4:
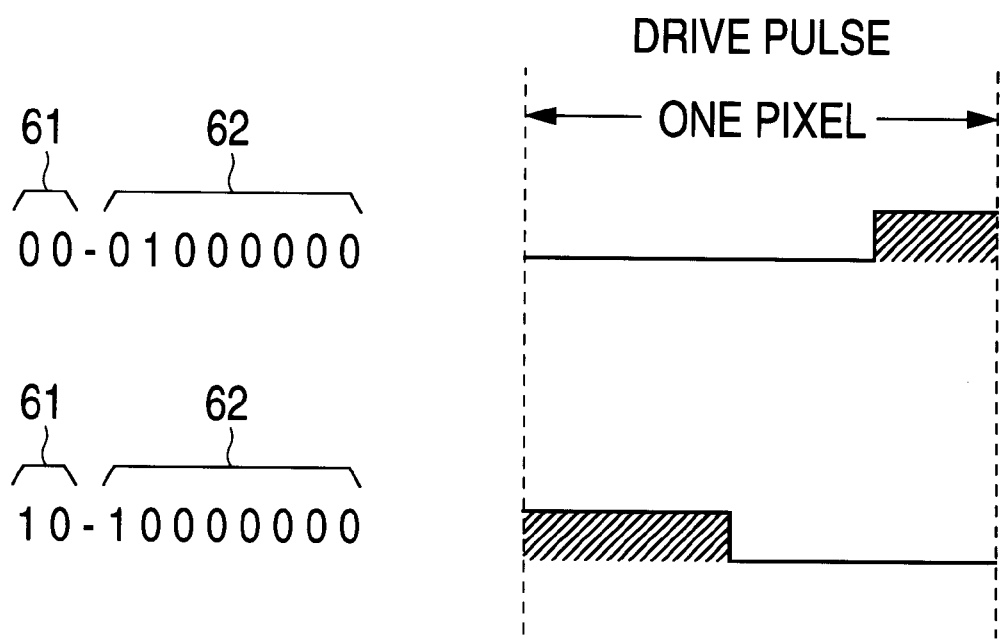
FIG. 4 is a diagram showing an example of a laser drive pulse.

FIG. 4 shows an example of the thus-generated laser drive pulse. If position data 61 is "00" and pulse-width data 62 is "01000000", a drive pulse shifted to the right and having a gradation value of 64 (a duty ratio of 64/256=1/4) is generated. If position data 61 is "10 "and pulse-width data 62 is "10000000", a drive pulse shifted to the left and having a gradation value of 128 (a duty ratio of 128/256=1/2) is generated.

As described above, a drive pulse, the pulse width of which has been modulated to 256 levels, is generated for each pixel so as to be supplied to the printing engine 700 so that a laser beam for drawing an electrostatic latent image is modulated. As described above, a printing engine having printing performance of a resolution of 600 dpi is able to express gradation of at most 20 to 30 levels for each pixel even if a drive pulse modulated to 256 levels is supplied. That is, only the number of gray scale levels which is the same as that when the pulse width of a laser drive pulse has been modulated to 20 to 30 levels can be reproduced. However, the above-mentioned pulse generating circuit 600 according to the present invention, arranged to slightly change pulse-width data items in the RAM 3 for each pixel, is able to cause the sense of sight of a human being to recognize as if 256 gray scale levels has been expressed.

Figure 5:
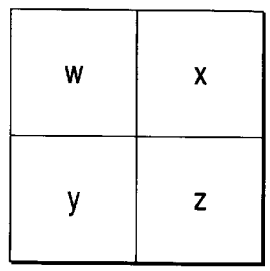
FIGS. 5(A) to 5(C) are diagrams showing the principle for expressing a multiplicity of gray scale levels.
Figure 5:
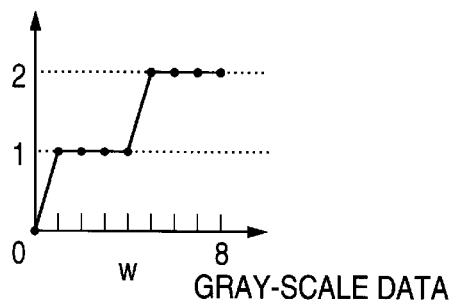
Figure 5:
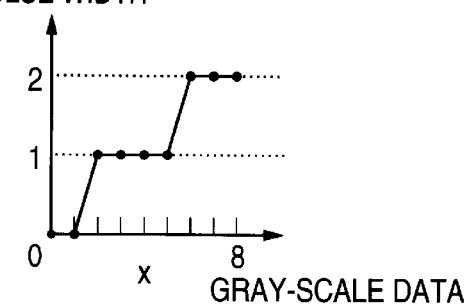
Figure 5:
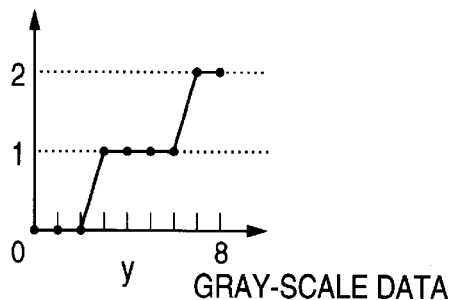
Figure 5:
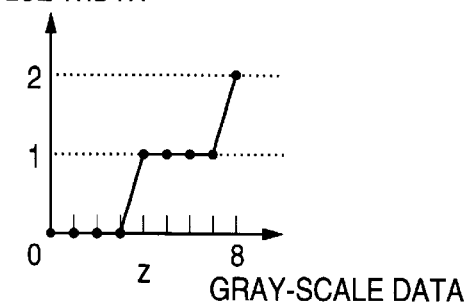
Figure 5:
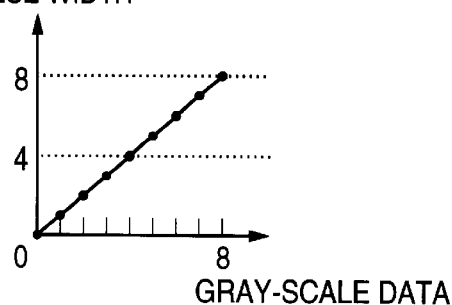

FIGS. 5(A) to 5(C) shows a principle of the foregoing structure. To easily understand the principle, a model formed by simplifying the above-mentioned circuit 600 will now be described. As shown in FIG. 5(A), a matrix having four pixels w, x, y and z is assumed. An assumption is further made that gray-scale data has 9 levels from 0 to 8 for each pixel. Moreover, another assumption is made that the substantial number of gray scale levels (that is, the gray scale levels of one pixel which can be reproduced by the engine) of the pulse width of the laser drive pulse is three levels from 0 to 2.

An assumption is made that the contents of pulse-width data corresponding to gray-scale data for the above-mentioned model are slightly changed among the pixels w, x, y and z, as shown in FIG. 5(B). In the example shown in FIG. 5(B), the pulse widths of the same gray-scale data items are changed in such a manner that the pixel w has a largest width, the pixel x and the pixel y have next widths and the pixel z has a smallest pulse width. As a result, the pulse widths of the four pixels w, x, y and z are averaged in the overall matrix region having the four pixels w, x, y and z as shown in FIG. 5(C) so that a result is obtained in that as if modulation with eight levels has been performed.

It is considerably difficult for the sense of sight of a human being to distinguish fine pixels of about 300 dpi from each other. Therefore, if the pixels w, x, y and z shown in FIG. 5(A) are 600 dpi pixels, the sense of sight for a human being is caused to integrally recognize the foregoing pixels w, x, y and z rather than individually recognizing the same. As a result, reproduction of 8 gray scale levels as shown in FIG. 5(C) is recognized.

In accordance with the above-mentioned principle, the pulse generating circuit 600 according to this embodiment has a structure that pulse-width data items, which are slightly different from one another, are stored in the nine pixel memory regions 31 to 39 in the RAM 3. As a result, the pulse widths of the nine pixels a to i are averaged in the overall 3×3 pixel matrix shown in FIG. 3(B) so that the number of gray scale levels which is nine times the 20 to 30 levels each of which is the substantial number of gray scale levels of each pixel is expressed. If the printing engine has great performance about 600 dpi, the sense of sight for a human being usually integrally recognizes pixels in the 3×3 pixel matrix in place of recognizing the same individually. Therefore, the sense of sight for a human being recognizes that 256 levels have been reproduced in the printed out image.

Figure 6:
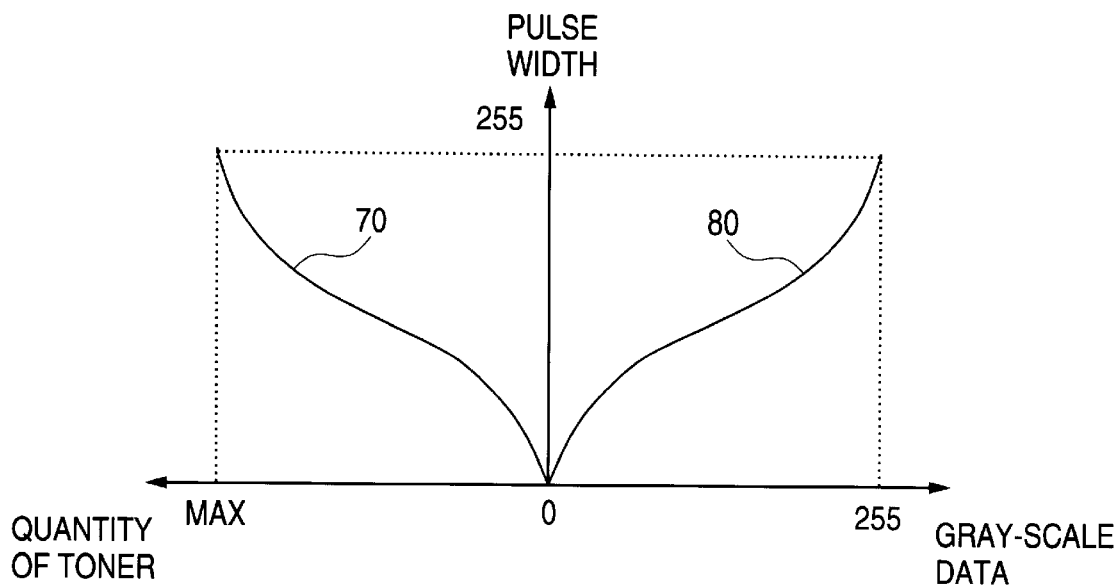
FIGS. 6(A) and 6(B) are characteristic graphs showing the principle of γ-correction.
Figure 6:
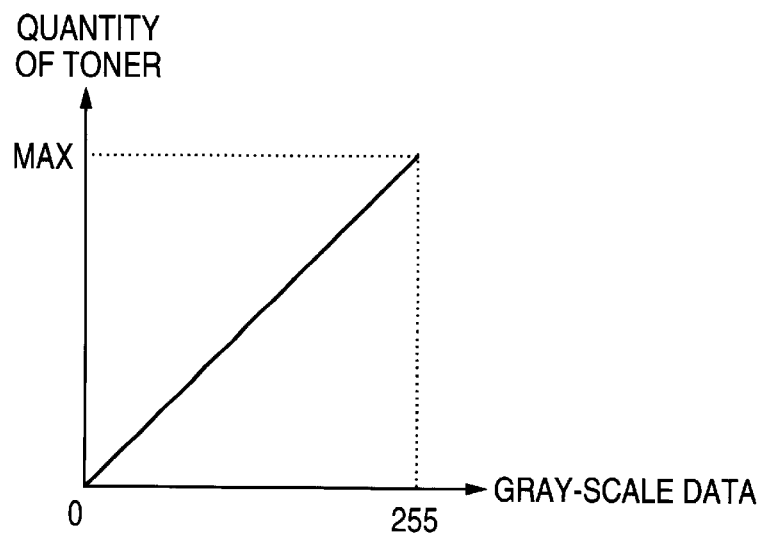

The circuit according to this embodiment is arranged in such a manner that an inverted γ-characteristic which is inversion to the γ-characteristic of the printing engine is incorporated to pulse-width data in the RAM 3 in order to correct the γ-characteristic of the printing engine. FIG. 6(A) shows a γ-characteristic 70 of the printing engine and an inverted γ-characteristic 80 incorporated to pulse-width data.

As indicated with the γ-characteristic 70, the pulse width of the drive pulse and the actual quantity of toner which is allowed to adhere have not a linear relationship. In particular, the change ratio of the toner adhesion quantity with respect to the pulse width is reduced in a region in which the pulse width (the duty ratio) is near the maximum value (a dense region). Therefore, the inverted γ-characteristic 80 is incorporated to the relationship of the pulse width with respect to gray-scale data so that the relationship of the toner adhesion quantity with respect to gray-scale data is made to be linear and thus the γ-characteristic is corrected, as shown in FIG. 6(B).

The pulse generating circuit 600 according to this embodiment uses a principle like the principle described with reference to FIGS. 5(A) to 5(C) in order to precisely perform the γ-correction. That is, the inverted γ-characteristic 80 incorporated to pulse-width data in the RAM 3 is made to be slightly different among the pixel memory regions so that a precise inverted γ-characteristic is realized in the 3×3 pixel matrix 7 shown in FIG. 3(B).

Figure 7:
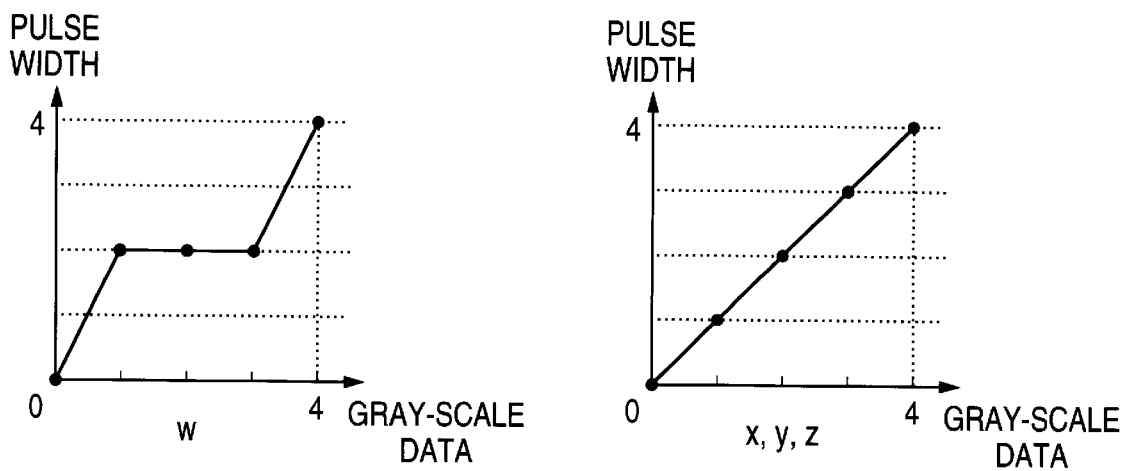
FIGS. 7(A) and 7(B) are diagrams showing the principle of precise γ-correction.
Figure 7:
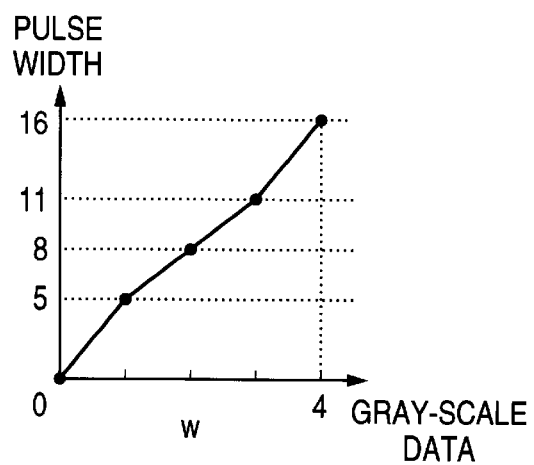

FIGS. 7(A) and 7(B) show the above-mentioned principle by using the simplified 4-pixel matrix model shown in FIG. 5(A). An assumption is made that pulse-width data to which an inverted γ-characteristic as shown in the left-hand portion of FIG. 7(A) has been incorporated is provided for the pixel w of the four pixels w, x, y and z and linear pulse-width data as shown in the left-hand portion of FIG. 7(A) is provided for each of the three pixels x, y and z. Since the sense of sight for a human being easily recognizes the four pixels w, x, y and z as an integrated body in the above-mentioned case, an inverted γ-characteristic in the form in which the four pixels are integrated as shown in FIG. 7(B) appears. When the inverted γ-characteristic in the integrated form shown in FIG. 7(B) is subjected to a comparison with the inverted γ-characteristic of one pixel shown in FIG. 7(A), the inverted γ-characteristic in the integrated form has substantially 16 modulation levels of pulse width which is four times the number of modulation levels realized by the inverted γ-characteristic of one pixel which is four levels. Therefore, precise γ-correction can be performed.

The pulse generating circuit 600 according to this embodiment is effective when image data 400 having a resolution lower than that of the printing engine is processed. An assumption is made that the resolution of the printing engine is, for example, 600 dpi. As described above with reference to FIG. 2, the address generating circuit 1 generates one address word 2 for each pixel to supply the same to the RAM 3 when the address generating circuit 1 processes image data having a resolution of 600 dpi which is the same as that of the engine.

Figure 8:
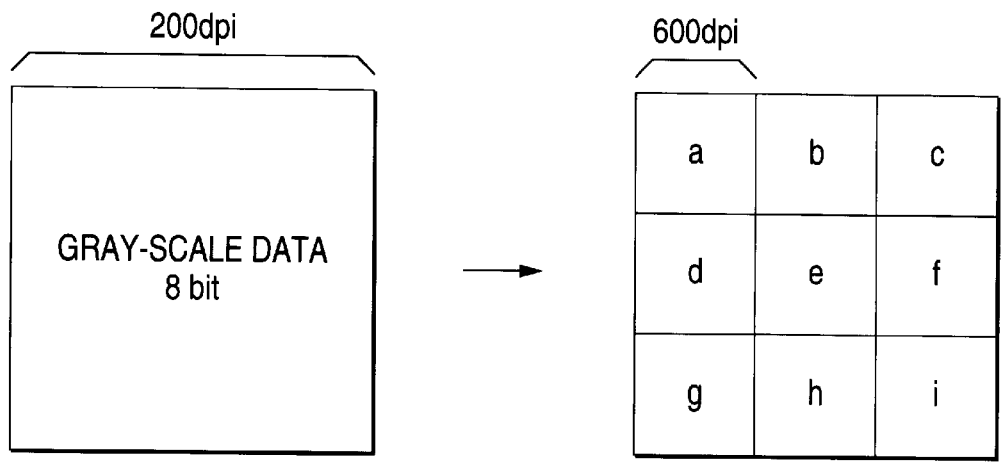
FIG. 8 is a diagram showing the operation which is performed when a 200-dpi image is printed.

When image data 400 having a resolution of, for example, 200 dpi which is lower than the resolution of the engine is processed, the address generating circuit 1 repeatedly scans each line of 200-dpi image data 400 three times because one 200 dpi pixel includes nine 600-dpi pixels a to i as shown in FIG. 8 to repeatedly read gray-scale data of each pixel on each line three time so as to generate vertical and horizontal address data items 21 and 22 of one pixel among the nine 600-dpi pixels a to i. Thus, nine laser drive pulses for drawing nine 600-dpi pixels can be generated from 200-dpi gray-scale data of one pixel. As can be understood from the principle described with reference to FIGS. 5(A) to 5(C), real 256 gray scale levels can be reproduced for each 200-dpi pixel. Note that the above-mentioned process which is performed by the address generating circuit 1 can be realized by software as well as an exclusive hardware.

Figure 9:
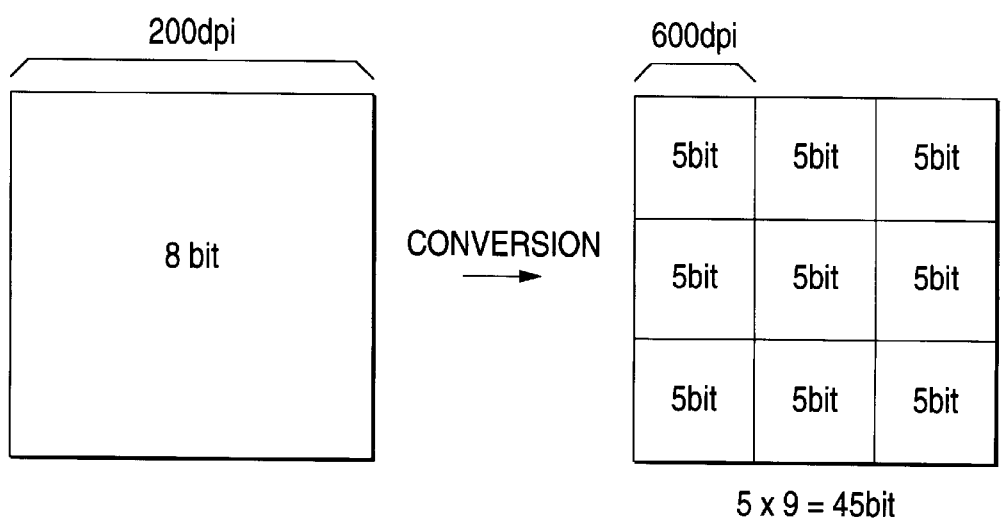
FIG. 9 is a diagram showing a demerit realized when a software process is performed.

The pulse generating circuit 600 according to this embodiment has the structure that gray-scale data is converted into pulse-width data by reading pulse-width data from the RAM 3 as shown in FIG. 2 in place of employing a software process. Therefore, an advantage is realized in that the capacity of the image memory for storing image data can be reduced when image data having a resolution lower than the performance of the engine is processed. If the operation, which is performed by the circuit according to this embodiment, is carried out by a software operation to process, for example, 200-dpi image data, software above must divide one 200-dpi pixel into nine 600-dpi pixels after which it generates pulse-width data (a gray scale value) for each of the nine 600-dpi pixels, as shown in FIG. 9. Since the number of gray scale levels which can be reproduced by one 600-dpi pixel is 20 to 30 as described above, for example, five-bit data is required for each of the 600-dpi pixel to express the pixel. Therefore, data in a quantity that 5 bits×9=45 bits is required to be generated for each of 200-dpi pixels, thus causing the image memory 500 having a large capacity capable of storing the foregoing data item to be required. If the circuit according to this embodiment is employed, only 8-bit data is required to be stored in the image memory 500 for each of the 200-dpi pixels. Thus, the required capacity of the memory can significantly be reduced as compared with the software process.

Although the invention has been described in its preferred form, it is understood that the present disclosure of the preferred form can be changed in the details of construction and in the combination and arrangement of parts.

What is claimed is:

1. A pulse-width data generating apparatus usable with a toner-transfer-type printing apparatus which responds to image data to form an output image, and arranged to generate pulse-width data causing a printing engine to form each pixel of a plurality of pixels forming the output image from gray-scale data of each pixel in the image data, said apparatus comprising:

pulse-width generating means for receiving the image data to generate pulse-width data of each pixel corresponding to coordinates of each pixel in a N×M pixel matrix on the output image and the gray-scale data of each pixel in the image data, wherein N and M are positive integers; and position-data generating means which receives and compares, to each other, the pulse-width data of adjacent pixels on both of two sides of each pixel on the output image to generate position data for controlling toner adhesion positions of each pixel.

2. A pulse-width data generating apparatus according to claim 1, wherein said pulse-width generating means comprises a memory comprising N×M pixel memory regions corresponding to N×M pixels disposed to form the N×M pixel matrix on the output image, and pulse-width data corresponding to values for the gray-scale data, are stored in each of said pixel memory regions, and wherein said pulse-width generating means receives the coordinates of each pixel in said N×M pixel matrix corresponding to the pixels in the image data and the gray-scale data of each pixel in the image data to read out the pulse-width data corresponding to the gray-scale data from said pixel memory region addressed with the coordinates.

3. A pulse-width data generating apparatus according to claim 1, wherein said pulse-width generating means changes the pulse-width data corresponding to the gray-scale data according to the coordinates of each pixel in said N×M pixel matrix.

4. A pulse-width data generating apparatus according to claim 1, wherein the product of N×M multiplied by the number of gray-scale levels of one pixel of the output image which can be reproduced by said printing apparatus is substantially equal to the number of gray-scale levels which is expressed by the gray-scale data.

5. A pulse-width data generating apparatus according to claim 1, wherein the pulse-width data generated by said pulse-width generating means includes an inverted γ-characteristic for correcting a γ-characteristic of said printing engine.

6. A pulse-width data generating apparatus according to claim 5, wherein said pulse-width generating means changes the inverted γ-characteristics of the pulse-width data according to the coordinates of each pixel in said N×M pixel matrix.

7. A pulse-width data generating apparatus according to claim 1, further comprising a pulse-width modulation circuit for receiving, from said pulse-width generating means and said position-data generating means, the pulse-width data of each pixel on the output image and the position data, and generating a pulse signal having a pulse width corresponding to the pulse-width data and a pulse position corresponding to the position data to supply the pulse signal to said printing engine.

8. A pulse-width data generating method used for a toner-transfer-type printing method which responds to image data to form an output image, and arranged to generate pulse-width data for causing a printing engine to form each pixel of the output image from gray-scale data of each pixel in the image data, said method comprising the steps of:

receiving the image data;

generating pulse-width data for each pixel corresponding to coordinates of each pixel in a N×M pixel matrix virtually tiled on the output image and the gray-scale data of each pixel in the image data, wherein N and M are positive integers;

comparing the pulse-width data of pixels on both of two sides of each pixel on the output image to each other; and generating position data for controlling toner adhesion positions of each pixel based on a result of the comparison.

9. A pulse-width data generating apparatus, said apparatus comprising:

a pulse-width generator operative to receive image data and generate pulse-width data therefrom for each of a plurality of pixels in an N×M pixel matrix, said matrix being representative of an output image and wherein N and M are positive integers; and a position-data generator operative to receive and compare the pulse-width data of two pixels one on either side of each pixel in the output image and generate position data therefrom usable to control adhesion positions of toner for each of said pixels in the output image.

10. The pulse-width data generating apparatus of claim 9, wherein said position data is generated such that said toner is controlled to adhere more to a right side of a given pixel when it is determined from the comparison in said position-data generator that a pulse-width corresponding to a pixel on the right side of said given pixel is greater than a pulse-width corresponding to a pixel on the left side of said given pixel, and said toner is controlled to adhere more to a left side of said given pixel when it is determined from the comparison in said position-data generator that said pulse-width corresponding to said pixel on the left side of said given pixel is greater than said pulse-width corresponding to said pixel on the right side of said given pixel, and said toner is controlled to adhere to a center of said given pixel when it is determined from the comparison in said position-data generator that said pulse-width corresponding to said pixel on the right side of said given pixel is substantially equal to said pulse-width corresponding to said pixel on the left side of said given pixel.

* * * * *